United States Patent
Dimmick

(10) Patent No.: US 10,325,261 B2
(45) Date of Patent: Jun. 18, 2019

(54) SYSTEMS COMMUNICATIONS WITH NON-SENSITIVE IDENTIFIERS

(71) Applicant: Visa International Service Association, San Francisco, CA (US)

(72) Inventor: James Dimmick, Belmont, CA (US)

(73) Assignee: Visa International Service Association, San Francisco, CA (US)

(*) Notice: Subject to any disclaimer, the term of this patent is extended or adjusted under 35 U.S.C. 154(b) by 423 days.

(21) Appl. No.: 14/952,514

(22) Filed: Nov. 25, 2015

(65) Prior Publication Data

US 2016/0148212 A1 May 26, 2016

Related U.S. Application Data

(60) Provisional application No. 62/084,456, filed on Nov. 25, 2014.

(51) Int. Cl.
*G06Q 20/40* (2012.01)
*G06F 21/62* (2013.01)
*G06Q 20/38* (2012.01)

(52) U.S. Cl.
CPC ..... *G06Q 20/4014* (2013.01); *G06F 21/6245* (2013.01); *G06Q 20/385* (2013.01); *G06Q 20/407* (2013.01); *G06Q 2220/00* (2013.01)

(58) Field of Classification Search
USPC .......................................................... 705/44
See application file for complete search history.

(56) References Cited

U.S. PATENT DOCUMENTS

| | | | |
|---|---|---|---|
| 5,613,012 A | 3/1997 | Hoffman |
| 5,781,438 A | 7/1998 | Lee |
| 5,850,442 A | 12/1998 | Muftic |
| 5,883,810 A | 3/1999 | Franklin |
| 5,953,710 A | 9/1999 | Fleming |
| 5,956,699 A | 9/1999 | Wong |
| 6,000,832 A | 12/1999 | Franklin |
| 6,014,635 A | 1/2000 | Harris |
| 6,044,360 A | 3/2000 | Piccialo |
| 6,163,771 A | 12/2000 | Walker |
| 6,227,447 B1 | 5/2001 | Campisano |
| 6,236,981 B1 | 5/2001 | Hill |
| 6,267,292 B1 | 7/2001 | Walker |
| 6,327,578 B1 | 12/2001 | Linehan |

(Continued)

FOREIGN PATENT DOCUMENTS

| | | |
|---|---|---|
| EP | 2156397 A1 | 2/2010 |
| WO | 2001035304 A1 | 5/2001 |

(Continued)

OTHER PUBLICATIONS

Privacy when you pay : credit, debit, cash and more, posted Jun. 1, 2007 25 pages (Year: 2007).*

(Continued)

*Primary Examiner* — Bruce I Ebersman
(74) *Attorney, Agent, or Firm* — Kilpatrick Townsend & Stockton LLP

(57) ABSTRACT

A method is disclosed for enabling transaction reversal processes without utilizing sensitive information. Instead of being identified by sensitive information, the transaction associated with a reversal can be identified by a transaction identifier that is generated by a resource provider.

14 Claims, 8 Drawing Sheets

(56) References Cited

U.S. PATENT DOCUMENTS

| | | | | |
|---|---|---|---|---|
| 6,341,724 | B2 | 1/2002 | Campisano | |
| 6,385,596 | B1 | 5/2002 | Wiser | |
| 6,422,462 | B1 | 7/2002 | Cohen | |
| 6,425,523 | B1 | 7/2002 | Shem Ur | |
| 6,592,044 | B1 | 7/2003 | Wong | |
| 6,636,833 | B1 | 10/2003 | Flitcroft | |
| 6,748,367 | B1 | 6/2004 | Lee | |
| 6,805,287 | B2 | 10/2004 | Bishop | |
| 6,879,965 | B2 | 4/2005 | Fung | |
| 6,891,953 | B1 | 5/2005 | DeMello | |
| 6,901,387 | B2 | 5/2005 | Wells | |
| 6,931,382 | B2 | 8/2005 | Laage | |
| 6,938,019 | B1 | 8/2005 | Uzo | |
| 6,941,285 | B2 | 9/2005 | Sarcanin | |
| 6,980,670 | B1 | 12/2005 | Hoffman | |
| 6,990,470 | B2 | 1/2006 | Hogan | |
| 6,991,157 | B2 | 1/2006 | Bishop | |
| 7,051,929 | B2 | 5/2006 | Li | |
| 7,069,249 | B2 | 6/2006 | Stolfo | |
| 7,076,458 | B2* | 7/2006 | Lawlor | G06Q 20/04 705/35 |
| 7,103,576 | B2 | 9/2006 | Mann, III | |
| 7,113,930 | B2 | 9/2006 | Eccles | |
| 7,136,835 | B1 | 11/2006 | Flitcroft | |
| 7,177,835 | B1 | 2/2007 | Walker | |
| 7,177,848 | B2 | 2/2007 | Hogan | |
| 7,194,437 | B1 | 3/2007 | Britto | |
| 7,263,506 | B2* | 8/2007 | Lee | G06Q 20/04 705/318 |
| 7,264,154 | B2 | 9/2007 | Harris | |
| 7,287,692 | B1 | 10/2007 | Patel | |
| 7,292,999 | B2 | 11/2007 | Hobson | |
| 7,350,230 | B2 | 3/2008 | Forrest | |
| 7,353,382 | B2 | 4/2008 | Labrou | |
| 7,379,919 | B2 | 5/2008 | Hogan | |
| RE40,444 | E | 7/2008 | Linehan | |
| 7,415,443 | B2 | 8/2008 | Hobson | |
| 7,444,676 | B1 | 10/2008 | Asghari-Kamrani | |
| 7,469,151 | B2 | 12/2008 | Khan | |
| 7,548,889 | B2 | 6/2009 | Bhambri | |
| 7,567,934 | B2 | 7/2009 | Flitcroft | |
| 7,567,936 | B1 | 7/2009 | Peckover | |
| 7,571,139 | B1 | 8/2009 | Giordano | |
| 7,571,142 | B1 | 8/2009 | Flitcroft | |
| 7,580,898 | B2 | 8/2009 | Brown | |
| 7,584,153 | B2 | 9/2009 | Brown | |
| 7,593,896 | B1 | 9/2009 | Flitcroft | |
| 7,606,560 | B2 | 10/2009 | Labrou | |
| 7,627,531 | B2 | 12/2009 | Breck | |
| 7,627,895 | B2 | 12/2009 | Gifford | |
| 7,650,314 | B1 | 1/2010 | Saunders | |
| 7,685,037 | B2 | 3/2010 | Reiners | |
| 7,702,578 | B2 | 4/2010 | Fung | |
| 7,707,120 | B2 | 4/2010 | Dominguez | |
| 7,712,655 | B2 | 5/2010 | Wong | |
| 7,734,527 | B2 | 6/2010 | Uzo | |
| 7,753,265 | B2 | 7/2010 | Harris | |
| 7,770,789 | B2 | 8/2010 | Oder, II | |
| 7,784,685 | B1 | 8/2010 | Hopkins, III | |
| 7,793,851 | B2 | 9/2010 | Mullen | |
| 7,801,826 | B2 | 9/2010 | Labrou | |
| 7,805,376 | B2 | 9/2010 | Smith | |
| 7,805,378 | B2 | 9/2010 | Berardi | |
| 7,828,220 | B2 | 11/2010 | Mullen | |
| 7,835,960 | B2 | 11/2010 | Breck | |
| 7,841,523 | B2 | 11/2010 | Oder, II | |
| 7,841,539 | B2 | 11/2010 | Hewton | |
| 7,844,550 | B2 | 11/2010 | Walker | |
| 7,849,020 | B2 | 12/2010 | Johnson | |
| 7,853,529 | B1 | 12/2010 | Walker | |
| 7,853,995 | B2 | 12/2010 | Chow | |
| 7,865,414 | B2 | 1/2011 | Fung | |
| 7,873,579 | B2 | 1/2011 | Hobson | |
| 7,873,580 | B2 | 1/2011 | Hobson | |
| 7,890,393 | B2 | 2/2011 | Talbert | |
| 7,891,563 | B2 | 2/2011 | Oder, II | |
| 7,896,238 | B2 | 3/2011 | Fein | |
| 7,922,082 | B2 | 4/2011 | Muscato | |
| 7,931,195 | B2 | 4/2011 | Mullen | |
| 7,938,318 | B2 | 5/2011 | Fein | |
| 7,954,705 | B2 | 6/2011 | Mullen | |
| 7,959,076 | B1 | 6/2011 | Hopkins, III | |
| 7,996,288 | B1 | 8/2011 | Stolfo | |
| 8,025,223 | B2 | 9/2011 | Saunders | |
| 8,046,256 | B2 | 10/2011 | Chien | |
| 8,060,448 | B2 | 11/2011 | Jones | |
| 8,060,449 | B1 | 11/2011 | Zhu | |
| 8,074,877 | B2 | 12/2011 | Mullen | |
| 8,074,879 | B2 | 12/2011 | Harris | |
| 8,082,210 | B2 | 12/2011 | Hansen | |
| 8,095,113 | B2 | 1/2012 | Kean | |
| 8,104,679 | B2 | 1/2012 | Brown | |
| RE43,157 | E | 2/2012 | Bishop | |
| 8,109,436 | B1 | 2/2012 | Hopkins, III | |
| 8,121,942 | B2 | 2/2012 | Carlson | |
| 8,121,956 | B2 | 2/2012 | Carlson | |
| 8,126,449 | B2 | 2/2012 | Beenau | |
| 8,170,928 | B2* | 5/2012 | Knowles | G06Q 10/087 235/380 |
| 8,171,525 | B1 | 5/2012 | Pelly | |
| 8,196,813 | B2 | 6/2012 | Vadhri | |
| 8,205,791 | B2 | 6/2012 | Randazza | |
| 8,224,702 | B2 | 7/2012 | Mengerink | |
| 8,225,385 | B2 | 7/2012 | Chow | |
| 8,265,993 | B2 | 9/2012 | Chien | |
| 8,266,047 | B2* | 9/2012 | Galit | G06Q 40/04 705/35 |
| 8,275,672 | B1* | 9/2012 | Nguyen | G06Q 30/0641 705/26.1 |
| 8,275,705 | B2 | 9/2012 | Katz et al. | |
| 8,280,777 | B2 | 10/2012 | Mengerink | |
| 8,328,095 | B2 | 12/2012 | Oder, II | |
| 8,376,225 | B1 | 2/2013 | Hopkins, III | |
| 8,380,177 | B2 | 2/2013 | Laracey | |
| 8,387,873 | B2 | 3/2013 | Saunders | |
| 8,401,539 | B2 | 3/2013 | Beenau | |
| 8,401,898 | B2 | 3/2013 | Chien | |
| 8,402,555 | B2 | 3/2013 | Grecia | |
| 8,403,211 | B2 | 3/2013 | Brooks | |
| 8,412,623 | B2 | 4/2013 | Moon | |
| 8,412,837 | B1 | 4/2013 | Emigh | |
| 8,417,642 | B2 | 4/2013 | Oren | |
| 8,447,699 | B2 | 5/2013 | Batada | |
| 8,453,223 | B2 | 5/2013 | Svigals | |
| 8,453,925 | B2 | 6/2013 | Fisher | |
| 8,458,487 | B1 | 6/2013 | Palgon | |
| 8,484,134 | B2 | 7/2013 | Hobson | |
| 8,485,437 | B2 | 7/2013 | Mullen | |
| 8,494,959 | B2 | 7/2013 | Hathaway | |
| 8,498,908 | B2 | 7/2013 | Mengerink | |
| 8,504,478 | B2 | 8/2013 | Saunders | |
| 8,510,816 | B2 | 8/2013 | Quach | |
| 8,533,860 | B1 | 9/2013 | Grecia | |
| 8,538,845 | B2 | 9/2013 | Liberty | |
| 8,555,079 | B2 | 10/2013 | Shablygin | |
| 8,566,168 | B1 | 10/2013 | Bierbaum | |
| 8,567,670 | B2 | 10/2013 | Stanfield | |
| 8,571,939 | B2 | 10/2013 | Lindsey | |
| 8,577,336 | B2 | 11/2013 | Mechaley, Jr. | |
| 8,577,803 | B2 | 11/2013 | Chatterjee | |
| 8,578,176 | B2 | 11/2013 | Mattsson | |
| 8,583,494 | B2 | 11/2013 | Fisher | |
| 8,584,251 | B2 | 11/2013 | Mcguire | |
| 8,589,237 | B2 | 11/2013 | Fisher | |
| 8,589,271 | B2 | 11/2013 | Evans | |
| 8,589,291 | B2 | 11/2013 | Carlson | |
| 8,595,098 | B2 | 11/2013 | Starai | |
| 8,595,812 | B2 | 11/2013 | Bomar | |
| 8,595,850 | B2 | 11/2013 | Spies | |
| 8,606,638 | B2 | 12/2013 | Dragt | |
| 8,606,700 | B2 | 12/2013 | Carlson | |
| 8,606,720 | B1 | 12/2013 | Baker | |
| 8,615,468 | B2 | 12/2013 | Varadarajan | |
| 8,620,754 | B2 | 12/2013 | Fisher | |

(56) References Cited

U.S. PATENT DOCUMENTS

| | | |
|---|---|---|
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,818,907 B2 | 8/2014 | Bonalle et al. |
| 8,887,308 B2 | 11/2014 | Grecia |
| 9,129,320 B2* | 9/2015 | Martin ............ G06Q 30/06 |
| 9,715,689 B1* | 7/2017 | Ellis ............ G06Q 20/367 |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0126094 A1* | 7/2003 | Fisher ............ G06Q 20/02 705/75 |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0195551 A1 | 8/2008 | McIsaac et al. |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0228340 A1* | 9/2009 | Bohannon ............ G06Q 10/107 705/14.53 |
| 2009/0248583 A1 | 10/2009 | Chhabra |
| 2009/0276347 A1 | 11/2009 | Kargman |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |
| 2011/0154466 A1 | 6/2011 | Harper |
| 2011/0161233 A1 | 6/2011 | Tieken |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0028609 A1 | 2/2012 | Hruska |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |

(56) References Cited

U.S. PATENT DOCUMENTS

| | | |
|---|---|---|
| 2012/0123940 A1 | 5/2012 | Killian |
| 2012/0129514 A1 | 5/2012 | Beenau |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0019098 A1 | 1/2013 | Gupta |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder, II et al. |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212666 A1 | 8/2013 | Mattsson |
| 2013/0218698 A1 | 8/2013 | Moon |
| 2013/0226813 A1 | 8/2013 | Voltz |
| 2013/0238455 A1* | 9/2013 | Laracey ............... G06Q 20/108 705/21 |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0052532 A1 | 2/2014 | Tsai |
| 2014/0052620 A1 | 2/2014 | Rogers |
| 2014/0052637 A1 | 2/2014 | Jooste |
| 2015/0032622 A1* | 1/2015 | Powell ................ G06Q 20/407 705/44 |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |

FOREIGN PATENT DOCUMENTS

| | | |
|---|---|---|
| WO | 2001035304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

* cited by examiner

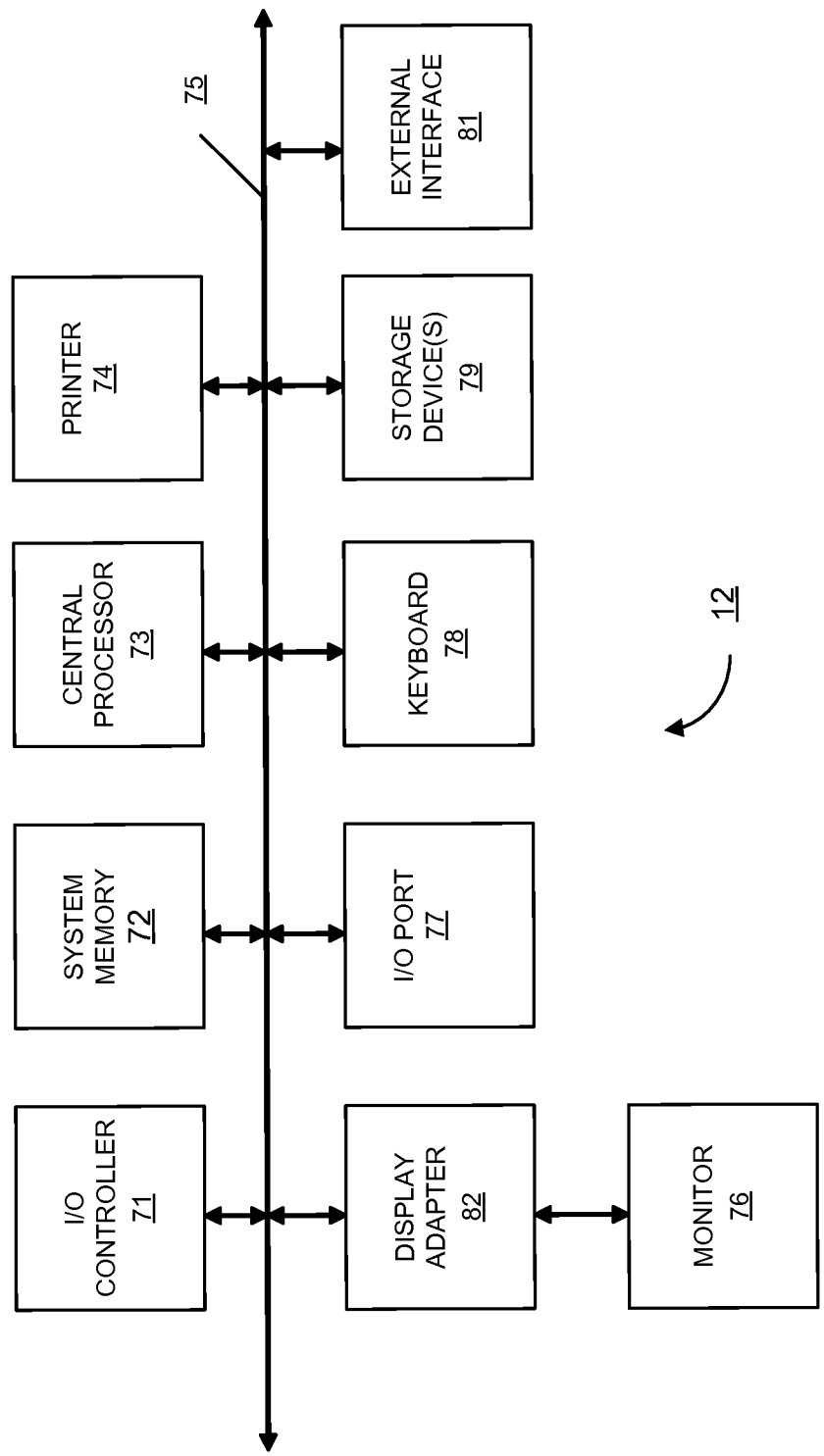

SYSTEMS COMMUNICATIONS WITH NON-SENSITIVE IDENTIFIERS

CROSS REFERENCE TO RELATED APPLICATIONS

This application is a non-provisional application of and claims the benefit of the filing date of U.S. Provisional Application No. 62/084,456, filed on Nov. 25, 2014, which is herein incorporated by reference in its entirety for all purposes.

BACKGROUND

Transactions are typically identified by sensitive account information (e.g., payment credentials). For example, stored transaction records are labeled by the associated account information. Entities communicating about a certain transaction will often use the associated account information to indicate the specific transaction. Thus, account information is regularly included in network communications, and many copies of account information may be stored across multiple databases. This can cause exposure and security issues, as there is a chance of an unwanted security breach of sensitive account information.

Embodiments of the invention address these and other problems individually and collectively.

SUMMARY

One embodiment of the invention is directed to a method. The method comprises receiving, by a transaction processing computer, from a resource provider computer, a request for reversing a transaction between a user and a resource provider. The request includes a resource provider identifier and a transaction identifier, and the request does not include an account identifier associated with an account of the user. The transaction is uniquely identified by the resource provider identifier and the transaction identifier. The method further comprises validating the resource provider identifier and the transaction identifier, determining an authorizing entity identifier based on the resource provider identifier and the transaction identifier, and forwarding the request to an authorizing entity computer associated with the determined authorizing entity identifier. The authorizing entity computer then determines the account identifier based on the resource provider identifier and the transaction identifier, and the authorizing entity computer approves of the transaction reversal.

Another embodiment of the invention is directed to a transaction processing computer configured to perform the above-described method.

Another embodiment of the invention is directed to a method comprising receiving, by a transaction processing computer, from an authorizing entity computer, a request for reversing a transaction between a user and a resource provider. The request includes a resource provider identifier and a transaction identifier, and the request does not include an account identifier associated with an account of the user. The transaction is uniquely identified by the resource provider identifier and the transaction identifier. The method further comprises validating the resource provider identifier and the transaction identifier, determining a transport computer associated with the resource provider, and forwarding the request to the determined transport computer. The transport computer then uses the resource provider identifier and the transaction identifier when communicating with a resource provider computer about the transaction reversal request.

Another embodiment of the invention is directed to a transaction processing computer configured to perform the above-described method.

Further details regarding embodiments of the invention can be found in the Detailed Description and the Figures.

BRIEF DESCRIPTION OF THE DRAWINGS

FIG. 8 shows a block diagram of a computer apparatus according to an embodiment of the invention.

DETAILED DESCRIPTION

Figure 1:
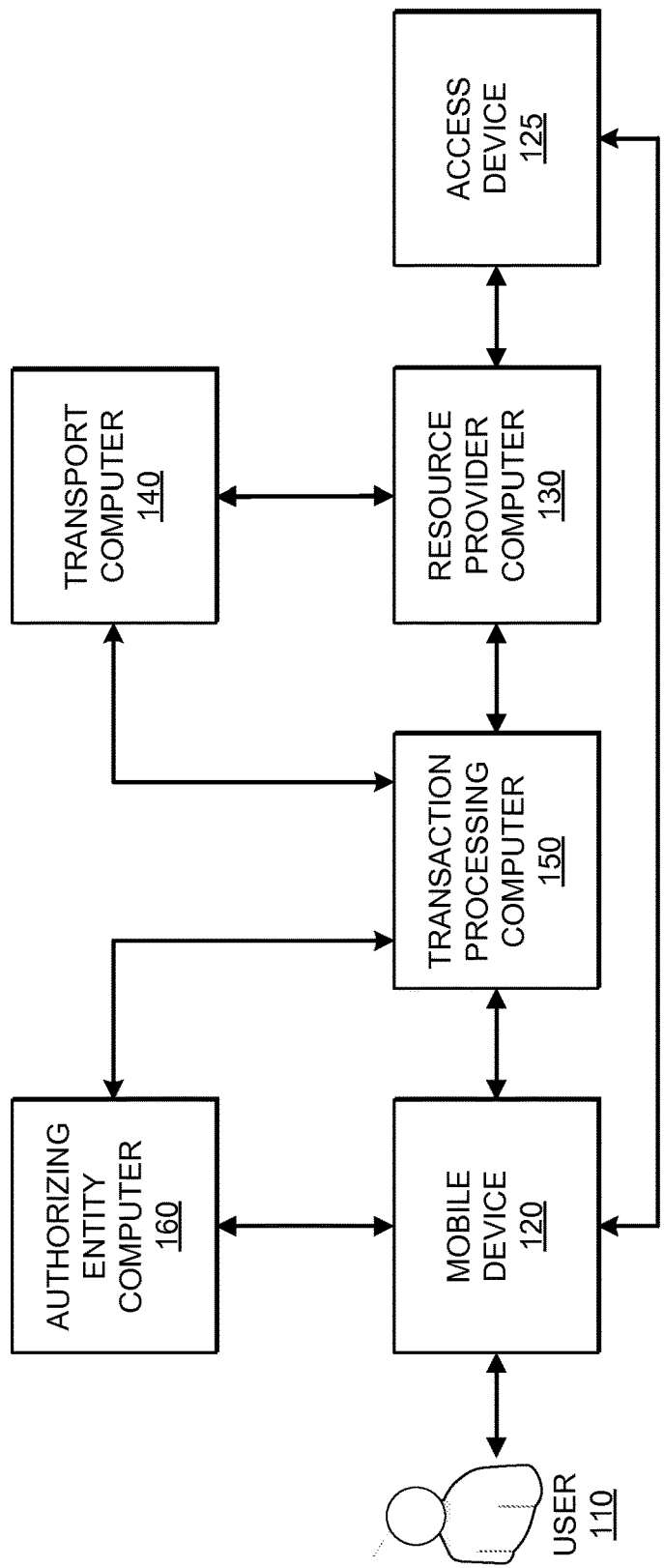
FIG. 1 shows a block diagram of a system according to an embodiment of the invention.

Embodiments of the present invention are directed to methods and systems for processing transaction reversals (e.g., returns and chargebacks) without utilizing or exposing sensitive information, such as account information and user information. Instead, merchant-generated transaction identifiers can be used to identify specific transactions during transaction reversal processing.

For example, a transaction can be uniquely identified by a transaction identifier paired with a resource provider identifier. The transaction identifier may have been generated by a resource provider and may be locally unique among transaction identifiers generated by the resource provider. However, the transaction identifier may not be globally unique, as other resource providers can also generate their own transaction identifiers, and thus it may be possible that another resource provider generate and utilize an identical transaction identifier. Accordingly, a central entity, such as a transaction processor, may generate a unique resource provider identifier for each resource provider. Thus, transactions may be uniquely identified on a global level by a combination of a transaction identifier and a resource provider identifier.

In some embodiments, in communications regarding a transaction reversal, the transaction may be identified by an associated resource provider identifier, transaction identifier, and any other suitable information. Additionally, entities within the transaction processing system that store transaction records may identify transaction records based on the resource provider identifier and transaction identifier. Accordingly, communications and transaction records can omit sensitive information formerly used to identify transactions, such as payment credentials. Transaction identifiers and resource provider identifiers may not be considered sensitive information, as they may not identify a user or an account.

Thus, embodiments of the invention improve the security of sensitive information, as sensitive information does not need to be included in transaction reversal communications or widely stored by different entities. Particularly, the payment credentials and other sensitive information can be removed from transaction processing entities, such as acquirer, resource provider, and consumer domains. Additionally, enabling resource providers to generate transaction identifiers creates a simple, elegant system for transaction identification. Instead of retrieving transaction identifiers from a central source for each transaction, transaction identifiers can be generated locally, decreasing back-and-forth communication and improving efficiency.

Prior to discussing specific embodiments of the invention, some terms may be described in detail.

"Transaction information" may be information that is associated with a transaction. Examples of transaction information include a resource provider identifier, a transaction identifier, a timestamp, a transaction amount, a merchant identifier, a merchant location, a terminal identifier, an acquirer identifier (such as an acquirer bank identification number (BIN)), a card acceptor ID, information identifying items being purchased, geo-location information, a digital wallet identifier, and/or any other suitable information. In some embodiments, some types of transaction information can be utilized to uniquely identify a transaction. For instance, a transaction may be uniquely identified by a resource provider identifier and a transaction identifier.

A "transaction identifier" may include an identifier that represents a transaction. In one example, a transaction identifier may include a series of alphanumeric characters or any other indicator suitable for identifying a transaction. In some embodiments, a transaction identifier can be generated locally by a resource provider computer and associated with one local transaction. As a result, in some embodiments, a transaction identifier may be locally unique to the resource provider, but not be globally unique as another resource provider may generate the same transaction identifier. In some embodiments, a transaction identifier may comprise an authorizing entity identifier. For example, the first several (e.g., 4-6) digits of a transaction identifier may be used for identifying an authorizing entity and/or a transaction processor. In some embodiments, the transaction identifier format may be configured to allow the entity receiving the transaction identifier to identify it as a transaction identifier.

A "resource provider identifier" may include an identifier that represents a resource provider. In some embodiments, a resource provider identifier may include any suitable combination of alphanumeric characters. An example of such a resource provider identifier can be "RETAIL 489200385." In some embodiments, resource provider identifiers can be generated by a central entity, such as a transaction processing computer.

A "transaction reversal" may be a process for undoing a transaction. For example, during a transaction reversal, various entities may communicate so that funds spent by a consumer on a previous transaction may be reimbursed to the consumer's account. Also, purchased goods or services may be returned to a resource provider from a consumer. Examples of a transaction reversal include a refund and a chargeback. A refund can take place when a consumer no longer desires to keep purchased items. The consumer may return the purchased items to the resource provider, and the resource provider may initiate the transaction reversal. A chargeback can take place when a fraudulent transaction occurred, or when a consumer otherwise disputes the legitimacy of an account charge. The consumer may contact an authorizing entity, and the authorizing entity may initiate the transaction reversal. A chargeback request may lead to a dispute process, where the authorizing entity, resource provider, acquirer, consumer, and any other suitable entity may communication in order to determine which party is liable for the account charge.

A "refund request message" may be an electronic message that requests a refund for a transaction. In some embodiments, a refund request message may be generated by a merchant computer and sent to a transaction processing computer and/or an issuer of a payment card to request a refund. A refund request message according to some embodiments may comply with ISO 8583, which is a standard for systems that exchange electronic transaction information associated with a payment made by a user using a payment device or payment account. The refund request message may include a transaction identifier associated with the transaction, and a resource provider identifier associated with the resource provider. In some embodiments, a transaction can be uniquely identified on a global level based on a combination of the transaction identifier and the resource provider identifier. In some embodiments, a refund request message may also include any other suitable transaction information, such as the transaction amount, timestamp, merchant identifier, merchant location, acquirer bank identification number (BIN), card acceptor ID, information identifying items previously purchased, etc., as well as any other information that may be utilized in determining whether to identify and/or authorize a refund. In some embodiments, a refund request message may not include user identifying information, payment information, or any other sensitive information.

A "chargeback request message" may be an electronic message that requests a chargeback for a transaction. In some embodiments, a chargeback request message may be generated by an issuer computer and sent to a transaction processing computer and/or an acquirer computer of a merchant request a chargeback. A chargeback request message according to some embodiments may comply with ISO 8583, which is a standard for systems that exchange electronic transaction information associated with a payment made by a user using a payment device or payment account. The chargeback request message may include a transaction identifier associated with the transaction, and a resource provider identifier associated with the resource provider. In some embodiments, a transaction can be uniquely identified on a global level based on a combination of the transaction identifier and the resource provider identifier. In some embodiments, a chargeback request message may also include any other suitable transaction information, such as the transaction amount, timestamp, merchant identifier, merchant location, acquirer bank identification number (BIN), card acceptor ID, information identifying items previously purchased, etc., as well as any other information that may be utilized in determining whether to identify and/or authorize a chargeback. In some embodiments, a chargeback request message may not include user identifying information, payment information, or any other sensitive information. A chargeback request message may also include a reason code the identified a reason for the chargeback. A reason code may be a number (e.g., a two or four digit number). Different reason codes may be associated with different reasons, such as non-receipt of information, fraud, authorization error, processing error, cancelled or returned merchandise, non-receipt of goods or services, or any other suitable reason.

A "mobile device" or "user device" may comprise any suitable electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile devices include mobile phones (e.g. cellular phones), PDAs, tablet computers, net books, laptop computers, personal music players, hand-held specialized readers, etc. Further examples of mobile devices include wearable devices, such as smart watches, fitness bands, ankle bracelets, rings, earrings, etc., as well as automobiles with remote communication capabilities. A mobile device may comprise any suitable hardware and software for performing such functions, and may also include multiple devices or components (e.g. when a device has remote access to a network by tethering to another device—i.e. using the other device as a modem—both devices taken together may be considered a single mobile device).

"Payment credentials" may include any suitable information associated with an account (e.g. a payment account and/or payment device associated with the account). Such information may be directly related to the account or may be derived from information related to the account. Examples of account information may include an "account identifier" such as a PAN (primary account number or "account number"), user name, expiration date, CVV (card verification value), dCVV (dynamic card verification value), CVV2 (card verification value 2), CVC3 card verification values, etc. An example of a PAN is a 16-digit number, such as "4147 0900 0000 1234." CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a user name, an expiration date, a gift card number or code, a payment token, and any other suitable information. In some embodiments, payment credentials may be considered sensitive information.

A "digital wallet" can include an electronic device that allows an individual to conduct electronic commerce transactions. A digital wallet may store user profile information, payment credentials, bank account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A digital wallet may be designed to streamline the purchase and payment process. A digital wallet may allow the user to load one or more payment cards onto the digital wallet so as to make a payment without having to enter an account number or present a physical card. A digital wallet may also store transaction records (e.g., electronic receipts), and may include transaction reversal functionality.

A "resource provider" may be an entity that can provide a resource such as goods, services, information, and/or access. Examples of a resource provider include merchants, access devices, secure data access points, etc. A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An authorizing entity can be identified by an "authorizing entity identifier", which may be a string of characters or take any other suitable form. An example of an authorizing entity identifier is an issuer BIN (bank identification number).

An "issuer" may typically refer to a business entity (e.g., a bank) that maintains an account for a user. An issuer may also issue payment credentials stored on communication device, such as a cellular telephone, smart card, tablet, or laptop to the consumer. An issuer can be identified by an issuer identifier, such as a BIN. In some embodiments, a PAN can comprise a BIN in addition to other characters. For example, the first four to six digits of a PAN may be the BIN. Thus, a PAN can indicate an associated issuer. In some embodiments, a BIN can also identify a transaction processor.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "user information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction. Other examples of transaction information are provided above.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization. As noted above, in some embodiments, a transaction processing computer may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

FIG. 1 shows a system 100 comprising a number of components. The system 100 comprises a mobile device 120 operated by a user 110. The system 100 further comprises a resource provider computer 130, a transport computer 140, a transaction processing computer 150, and an authorizing entity computer 160, each of which may be embodied by one or more computers. The mobile device 120 may be in communication with an access device 125, which may in turn be in communication with the resource provider computer 130. Also, the mobile device 120, the access device 125, the resource provider computer 130, the transport computer 140, the transaction processing computer 150, and the authorizing entity computer 160 may all be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The user 110 may be a consumer that can purchase goods or services, and that can request a refund or chargeback for a previous transaction. The user 110 may be associated with the mobile device 120, a payment account, and a digital wallet application. The user 110 may be able to use the mobile device 120 (or another payment device) to conduct transactions with a resource provider associated with the resource provider computer 130. The mobile device 120 may store information associated with the user 110 and/or a payment account. For example, the mobile device 120 may store payment credentials as well as personal information such as a name, address, email address, phone number, or any other suitable user 110 identification information in a digital wallet application. The mobile device 120 may provide this information to the access device 125 during a transaction.

The user 110 may also be able to use the mobile device 120 for requesting transaction reversals. For example, the mobile device 120 may also store information about historical transactions, such as a resource provider identifier, a transaction identifier, and any other suitable transaction information, and may provide this information to the access device 125 to initiate a refund or to the authorization entity computer 160 to initiate a chargeback.

Figure 2:
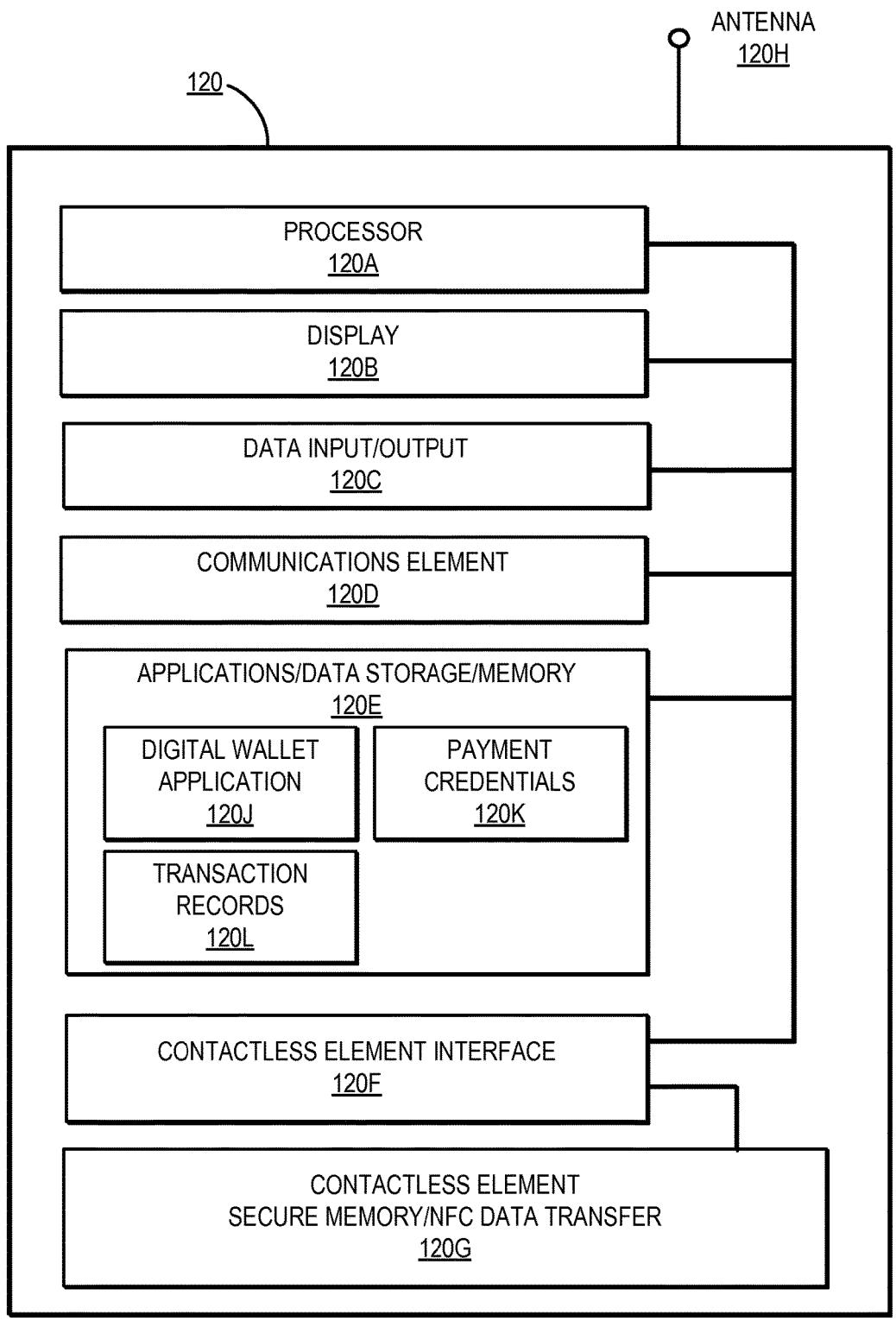
FIG. 2 shows a block diagram of an exemplary mobile device according to an embodiment of the invention.

An example of the mobile device 120, according to some embodiments of the invention, is shown in FIG. 2. Mobile device 120 may include circuitry that is used to enable certain device functions, such as telephony. The functional elements responsible for enabling those functions may include a processor 120A that can execute instructions that implement the functions and operations of the device. Processor 120A may access memory 120E (or another suitable data storage region or element) to retrieve instructions or data used in executing the instructions, such as provisioning scripts and mobile applications. Data input/output elements 120C, such as a keyboard or touchscreen, may be used to enable a user to operate the mobile device 120 and input data (e.g., user authentication data). Data input/output elements may also be configured to output data (via a speaker, for example). Display 120B may also be used to output data to a user. Communications element 120D may be used to enable data transfer between mobile device 120 and a wired or wireless network (via antenna 120H, for example) to assist in connectivity to the Internet or other network, and enabling data transfer functions. Mobile device 120 may also include contactless element interface 120F to enable data transfer between contactless element 120G and other elements of the device, where contactless element 120G may include a secure memory and a near field communications data transfer element (or another form of short range communications technology). As noted, a cellular phone or similar device is an example of a mobile device 120 that may be used in accordance with embodiments of the present invention. However, other forms or types of devices may be used without departing from the underlying concepts of the invention. For example, the mobile device 120 may alternatively be in the form of a payment card, a key fob, a tablet computer, a wearable device, etc.

The memory 120E may comprise a digital wallet application 120J, payment credentials 120K, transaction records 120L, and any other suitable module or data. The mobile device 120 may have any number of mobile applications installed or stored on the memory 120E and is not limited to that shown in FIG. 2. The memory 120E may also comprise code, executable by the processor 120A for implementing a method comprising receiving, by the mobile device, an instruction to activate a digital wallet application, activating the digital wallet application, displaying a list of transactions, receiving a selection of a transaction from the list of transactions, receiving a request for refund for the transaction, transmitting a request for transaction identifying information associated with the transaction, receiving transaction information including a transaction identifier and a resource provider identifier, wherein the transaction is uniquely identified by the resource provider identifier and the transaction identifier, transmitting a refund request to a resource provider computer, the request including the transaction information and not including an account identifier, wherein the resource provider computer sends a request for processing the refund to the transaction processing computer, and receiving an notification that the refund was successfully processed.

The digital wallet application 120J may provide a user interface for the user 110 to provide input and initiate, facilitate, and manage transactions using the mobile device 120. The digital wallet application 120J may be able to communicate with a digital wallet provider, which in some embodiments may be the transaction processing computer 150. The digital wallet application 120J may be distributed by the transaction processing computer 150, the authorizing entity computer 160, a third party provider, or any other suitable entity. The digital wallet application 120J may be able to store and/or access payment credentials 120K, or otherwise conduct payment transactions. In some embodiments, the payment credentials 120K may be stored (along with other sensitive account or personal information) in a secure element that can be implemented in either hardware and/or software.

The digital wallet application 120J may also be able to request transaction reversals. For example, the digital wallet application 120J may maintain or have access to transaction records 120L for transactions associated with the user's payment accounts and/or the digital wallet application 120J. In some embodiments, the transaction records 120L may include transaction information associated with the transactions, such as resource provider information (e.g., a name or address), a time, a date, an amount, purchased item information, and/or any other suitable transaction information. In some embodiments, the transaction records 120L may include special types transaction information that uniquely identifies a transaction, such as transaction identifiers, resource provider identifiers, and/or timestamps. In some embodiments, the transaction records 120L may not include sensitive information, such as the payment credentials 120K. The digital wallet application 120J may be able to display a list of the transactions to the user 110, receive a selection of a transaction, and provide options for requesting a transaction reversal. The digital wallet application 120J may be able to send transaction information to the access device 125, the transaction processing computer 150, and/or the authorizing entity computer 160 in order to request a transaction reversal.

Referring back to FIG. 1, the resource provider computer 130 may be associated with a resource provider. The resource provider may engage in transactions, sell goods or services, or provide access to goods or services to the user 110. The resource provider may accept multiple forms of payment and may use multiple tools to conduct different types of transactions. For example, the resource provider may operate a physical store and use the access device 125 for in-person transactions and refunds. The resource provider may also sell goods and/or services via a website, and may accept payments and process refunds over the Internet. In some embodiments, resource providers may also include entities that provide access to data or physical spaces, such as governmental agencies, secure data servers, access-limited doors and portals, etc.

Figure 3:
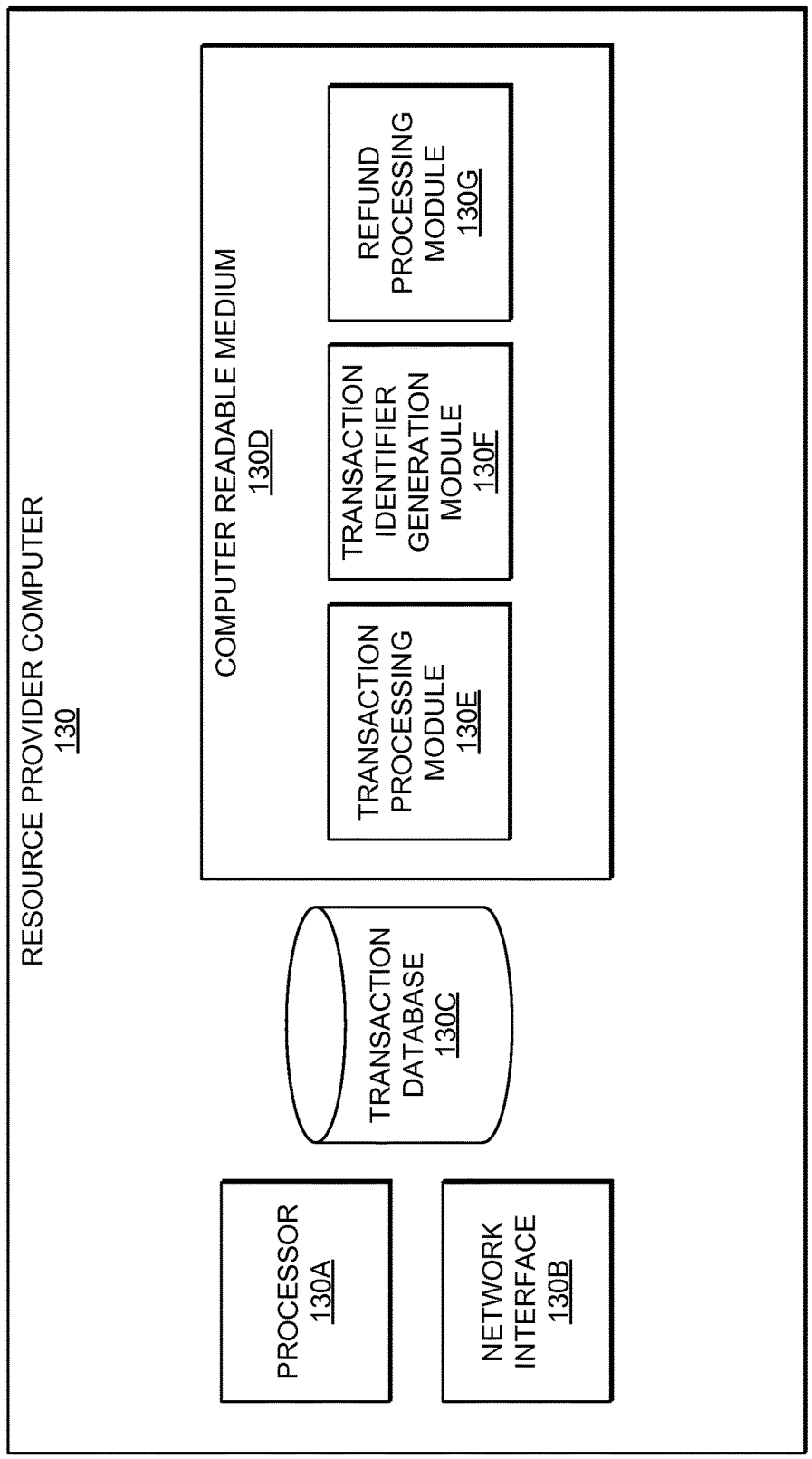
FIG. 3 shows a block diagram of a resource provider computer according to an embodiment of the invention.

An example of the resource provider computer 130, according to some embodiments of the invention, is shown in FIG. 3. The resource provider computer 130 comprises a processor 130A, a network interface 130B, a transaction database 130C, and a computer readable medium 130D.

The computer readable medium 130D may comprise a transaction processing module 130E, a transaction identifier generation module 130F, a refund processing module 130G, and any other suitable software module. The computer readable medium 130D may also comprise code, executable by the processor 130A for implementing a method comprising receiving a request from a user for reversing a transaction, the request including a resource provider identifier and a transaction identifier, the request not including an account identifier associated with an account of the user, wherein the transaction is uniquely identified by the resource provider identifier and the transaction identifier; identifying a historical transaction record based on the resource provider identifier and the transaction identifier, the historical transaction record including an amount; and sending a transaction reversal request including the amount, the resource provider identifier, and the transaction identifier to a transaction processing computer, wherein transaction reversal request is forwarded to an authorizing entity computer that allows the transaction reversal.

The transaction processing module 130E may comprise code that causes the processor 130A to process transactions. For example, the transaction processing module 130E may contain logic that causes the processor 130A to receive payment credentials from the user 110 for a transaction. The transaction processing module 130E may be able to initiate a transaction authorization process, and may also be able to finalize a transaction so that goods and/or services can be released. For example, the transaction processing module 130E may be able to assign a transaction identifier to a transaction, and generate an authorization request message including the payment credentials, transaction information (e.g., transaction identifier, resource provider identifier, timestamp, amount, items being purchased, etc.), and any other suitable information.

The transaction processing module 130E may also be able to generate transaction receipts and store transaction records. For example the transaction processing module 130E may store a record in the transaction database 130C for each transaction, each record including transaction information, such as a resource provider identifier and a transaction identifier, and any other suitable information. In some embodiments, the transaction processing module 130E may not store sensitive information, such as payment credentials, in the transaction database 130C. In some embodiments, the transaction processing module 130E may provide the transaction information (e.g., the resource provider identifier and the transaction identifier) to the user 110 and/or mobile device 120 via a receipt.

The transaction identifier generation module 130F may comprise code that causes the processor 130A to generate transaction identifiers. For example, the transaction identifier generation module 130F may contain logic that causes the processor 130A to generate and assign a unique transaction identifier for each transaction. Thus, historical transactions can be uniquely identified. In some embodiments, a transaction identifier may be partially composed of an authorizing entity identifier. For example, the transaction identifier generation module 130F may incorporate a BIN from a set of payment credentials into a transaction identifier. Thus, in some embodiments, the authorizing entity computer 160 may be identified by the transaction identifier.

The refund processing module 130G may comprise code that causes the processor 130A to process refunds. For example, the refund processing module 130G may contain logic that causes the processor 130A to receive transaction information (e.g., a transaction identifier and a resource provider identifier) from the user 110, and send a refund request message to the transaction processing computer 150 or the transport computer 140 so that a refund may be issued to the user 110. A refund request message may include the transaction information and any other suitable information. The refund processing module 130G may be able to identify a transaction record in the transaction database 130C based on transaction information received from the user 110, and may add any suitable additional information from the transaction record to the refund request message.

In some embodiments, the resource provider computer 130 may also be able to generate its own resource provider identifier. Whether the resource provider identifier is generated locally or received from an outside source, the resource provider computer 130 may store the resource provider identifier and include the resource provider identifier in each authorization request message, refund request message, and any other suitable communication where a transaction is being identified.

Referring back to FIG. 1, the resource provider computer 130 may submit authorization requests to the transport computer 140 (which may be an acquirer computer). The transport computer 140 may be associated with the resource provider computer 130, and may manage authorization requests as well as transaction reversals on behalf of the resource provider computer 130. In some embodiments, the transport computer 140 may also store transaction records where the transactions are identified by transactions information (e.g., a resource provider identifier, a transaction identifier, and/or a timestamp) instead of sensitive payment credentials. The transport computer 140 may be able to transmit funds from a resource provider account to a user 110 account at an authorizing entity computer 160.

As shown in FIG. 1, the transaction processing computer 150 may be disposed between the transport computer 140 and the authorizing entity computer 160. The transaction processing computer 150 may include data processing subsystems, networks, and operations used to support and deliver authorization services, exception file services, and clearing and settlement services. For example, the transaction processing computer 150 may comprise a server coupled to a network interface (e.g., by an external communication interface), and databases of information. The transaction processing computer 150 may be representative of a transaction processing network. An exemplary transaction processing computer may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The transaction processing computer 150 may use any suitable wired or wireless network, including the Internet.

Figure 4:
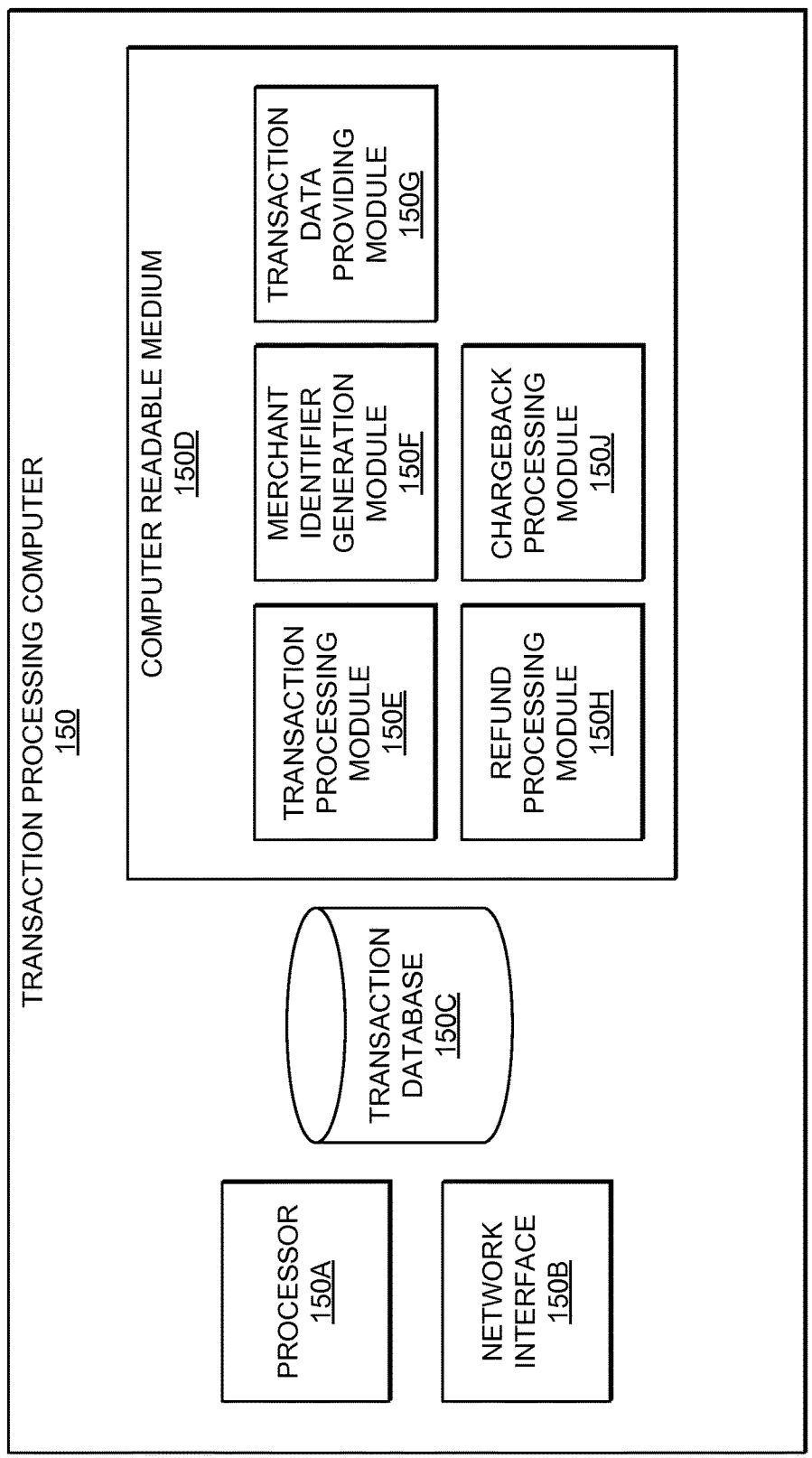
FIG. 4 shows a block diagram of a transaction processing computer according to an embodiment of the invention.

An example of the transaction processing computer 150, according to some embodiments of the invention, is shown in FIG. 4. The transaction processing computer 150 comprises a processor 150A, a network interface 150B, a transaction database 150C, and a computer readable medium 150D.

The computer readable medium 150D may comprise transaction processing module 150E, a merchant identifier generation module 150F, a transaction data providing module 150G, a refund processing module 150H, a chargeback processing module 150J, and any other suitable software module. The computer readable medium 150D may also comprise code, executable by the processor 150A for implementing a method comprising receiving, by a transaction processing computer, from a resource provider computer, a request for reversing a transaction between a user and a resource provider, the request including a resource provider identifier and a transaction identifier, the request not including an account identifier associated with an account of the user, wherein the transaction is uniquely identified by the resource provider identifier and the transaction identifier; validating, by the transaction processing computer, the resource provider identifier and the transaction identifier; determining, by the transaction processing computer, an authorizing entity identifier based on the resource provider identifier and the transaction identifier; and forwarding, by the transaction processing computer, the request to an authorizing entity computer associated with the determined authorizing entity identifier, wherein the authorizing entity computer determines the account identifier based on the resource provider identifier and the transaction identifier, and wherein the authorizing entity computer approves of the transaction reversal.

The transaction processing module 150E may comprise code that causes the processor 150A to process transactions. For example, the transaction processing module 150E may contain logic that causes the processor 150A to analyze transaction risk, and to forward, authorize, or reject authorization request messages for payment transactions. The transaction processing module 150E may also be able to store transaction records in the transaction database 150C. For example, the transaction database 150C may include a record of each completed transaction that includes transaction information (e.g., resource provider identifier, transaction identifier, timestamp, items purchased, amount, geolocation information), an issuer identifier (e.g., BIN), and/or any other suitable information. In some embodiments, the transaction database 150C may not include sensitive information, such as payment credentials. The transaction processing module 150E may be able to identify the issuer identifier from information in the authorization request message, such as a BIN from within a set of payment credentials.

The merchant identifier generation module 150F may comprise code that causes the processor 150A to generate resource provider identifiers. For example, the merchant identifier generation module 150F may contain logic that causes the processor 150A to assign a distribute a unique resource provider identifier to one or more resource provider computers 130 that submit authorization requests. In some embodiments, resource provider identifiers may instead be generated by other entities. Generating resource provider identifiers at a central location, such as the transaction processing computer 150, can allow for globally unique resource provider identifiers.

The transaction data providing module 150G may comprise code that causes the processor 150A to provide transaction information to suitable entities. For example, the transaction data providing module 150G may contain logic that causes the processor 150A to receive a request for transaction information from the user 110 or mobile device 120, and to transmit the appropriate transaction information to the requestor. The request may already include some transaction information that may be usable to identify a transaction, such as resource provider information, a time, a date, a digital wallet identifier, or any other suitable information. The transaction data providing module 150G may be able to use this transaction information to identify a transaction record in the transaction database 150C that includes the additional transaction information (e.g., resource provider identifier, transaction identifier, timestamp).

The refund processing module 150H may comprise code that causes the processor 150A to process refunds. For example, the refund processing module 150H may contain logic that causes the processor 150A to receive a refund request message from the transport computer 140 and forward the refund request message to the authorizing entity computer 160. The refund processing module 150H may be able to identify the authorizing entity computer 160 based on an authorizing entity identifier associated with the transaction in the transaction database 150C. The refund processing module 150H may also be able to validate the refund request message (e.g., by validating that the transaction information matches a transaction record in the transaction database 150C). The refund processing module 150H may be able to coordinate transfer of the refunded funds (e.g., authorizing, clearing, and settlement) between the transport computer 140 and the authorizing entity computer 160. The refund processing module 150H may also be able to send notifications about completed refunds to the resource provider computer 130, the mobile device 120, and any other suitable entity.

The chargeback processing module 150J may comprise code that causes the processor 150A to process chargebacks. For example, the chargeback processing module 150J may contain logic that causes the processor 150A to receive a chargeback request message from the authorizing entity computer 160 and forward the chargeback request message to the transport computer 140. The chargeback processing module 150J may be able to locate a transaction record in the transaction database 150C based on transaction information in the chargeback request message, and thereby validate the refund request message as well as identify an associated transport computer 140 indicated in the transaction record. The chargeback processing module 150J may be able to coordinate transfer of the chargeback funds (e.g., authorizing, clearing, and settlement) between the transport computer 140 and the authorizing entity computer 160. In some embodiments, chargeback processing module 150J may also be able to mediate disputes and establish communication channels between suitable entities for disputing transaction liability. The chargeback processing module 150J may further be able to send notifications about completed chargebacks to the resource provider computer 130, the mobile device 120, and any other suitable entity.

Referring back to FIG. 1, the transaction processing computer 150, the transport computer 140, and the authorizing entity computer 160 may operate suitable routing tables to route authorization request messages using payment credentials, merchant identifiers, or other account identifiers, and to route transaction reversal messages using resource provider identifiers, transaction identifiers, and/or authorizing entity identifiers.

The authorizing entity computer 160 may issue and manage a payment account and associated payment devices of the user 110. The authorizing entity computer 160 may be able authorize transactions and transaction reversals that involve the payment account.

Figure 5:
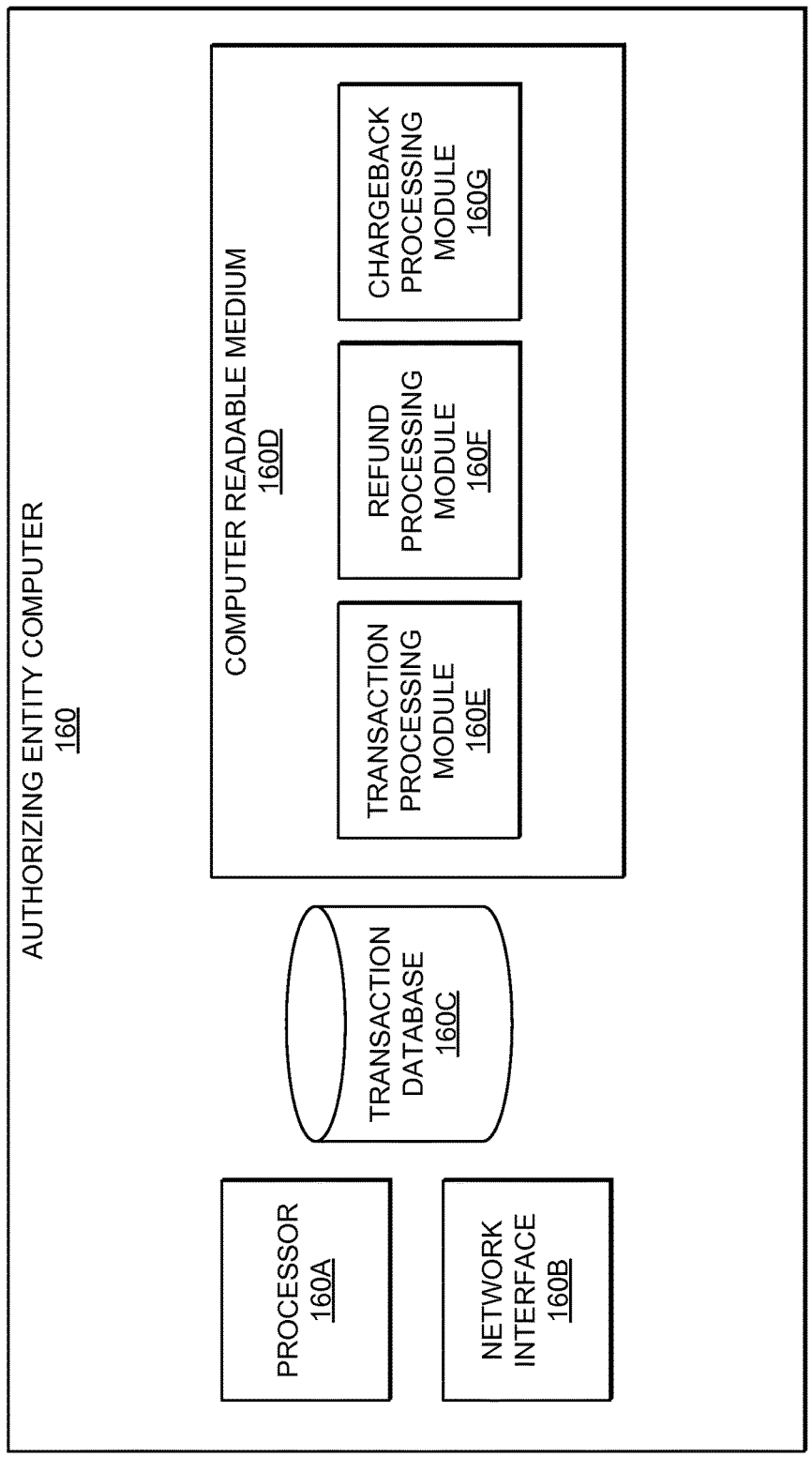
FIG. 5 shows a block diagram of an authorizing entity computer according to an embodiment of the invention.

An example of the authorizing entity computer 160, according to some embodiments of the invention, is shown in FIG. 5. The authorizing entity computer 160 comprises a processor 160A, a network interface 160B, a transaction database 160C, and a computer readable medium 160D.

The computer readable medium 160D may comprise transaction processing module 160E, a refund processing module 160F, a chargeback processing module 160G, and any other suitable software module. The computer readable medium 160D may also comprise code, executable by the processor 160A for implementing a method comprising receiving a request from a transaction processing computer for reversing a transaction between a user and a resource provider, the request including a resource provider identifier and a transaction identifier, the request not including an account identifier associated with an account of the user, wherein the transaction is uniquely identified by the resource provider identifier and the transaction identifier; validating the resource provider identifier and the transaction identifier; determining a user account based on the resource provider identifier and the transaction identifier; authorizing the transaction reversal, and sending a transaction reversal response to a transaction processing computer.

The transaction processing module 160E may comprise code that causes the processor 160A to process transactions. For example, the transaction processing module 160E may contain logic that causes the processor 160A to analyze transaction risk, and authorize or reject authorization request messages for payment transactions. Criteria for determining whether or not a transaction should be accepted or rejected may include the risk of fraud, and/or the available funds or credit in the account used to conduct a transaction. The transaction processing module 160E may also be able to store transaction records in the transaction database 160C. For example, the transaction database 160C may include a record of each completed transaction that includes transaction information (e.g., resource provider identifier, transaction identifier, timestamp, items purchased, amount, geolocation information), an associated payment account, user 110 identification information, and/or any other suitable information. In some embodiments, while sensitive information such as payment credentials and user 110 information may be stored in the transaction database 160C, the authorizing entity computer 160 may not utilize such information in communications (e.g., authorization response messages and transaction reversal messages), and instead may use the transaction information (e.g., the transaction identifier and the resource provider) to identify a transaction. Thus the authorizing entity computer 160 may contain the link between the user account and the transaction information.

The refund processing module 160F may comprise code that causes the processor 160A to process refunds. For example, the refund processing module 160F may contain logic that causes the processor 160A to receive a refund request message from the transaction processing computer 150, authorize the refund, and then send back a refund response message. The refund processing module 160F may be able to identify a transaction record in the transaction database 160C based on transaction information in the refund request message, and thereby determine the user account associated with the refund. The refund processing module 160F may be able to credit the user's account with the refunded funds from the transport computer 140.

The chargeback processing module 160G may comprise code that causes the processor 160A to process chargebacks. For example, the chargeback processing module 160G may contain logic that causes the processor 160A to receive a chargeback request from the user 110 or mobile device 120, identify an associated user account, and then send a chargeback request message to the transaction processing computer 150. In some embodiments, the request from the user 110 may include transaction information that uniquely identifies a transaction (e.g. the transaction identifier and the resource provider), while in other embodiments the request may include other transaction details. In either case, the chargeback processing module 160G may determine the appropriate transaction record and user account based on the received information. The chargeback processing module 160G may also be able to conduct transaction dispute communications with the transport computer 140, the resource provider computer 130, and any other suitable entity. The chargeback processing module 160G may be able to credit the user's account with the chargeback funds from the transport computer 140.

Methods for processing payments, refunds, and chargebacks can now be described. The steps shown in any method herein may be performed sequentially or in any suitable order in embodiments of the invention. In some embodiments, one or more of the steps may be optional. The various messages described below may use any suitable form of communication. In some embodiments, a request or response may be in an electronic message format, such as an e-mail, a short messaging service (SMS) message, a multimedia messaging service (MMS) message, a hypertext transfer protocol (HTTP) request message, a transmission control protocol (TCP) packet, a web form submission. The request or response may be directed to any suitable location, such as an e-mail address, a telephone number, an internet protocol (IP) address, or a uniform resource locator (URL). In some embodiments, a request or response may comprise a mix of different message types, such as both email and SMS messages.

In the methods 600 and 700 described further below, transaction information (e.g., a transaction identifier, resource provider identifier, and/or a timestamp) is used instead of payment credentials for identifying a transaction during refund and chargeback processing. Several entities already associate the transaction with the transaction information, and thus can identify the transaction when a message with transaction information is received. Accordingly, before describing the methods 600 and 700, a brief description will be first given regarding how the transaction information was originally distributed. Entities in FIG. 1 will be referred to for this description. However, in some embodiments, these activities can instead be performed by the entities in FIG. 6 or FIG. 7.

Transaction information may be distributed in any suitable manner. In some embodiments, transaction information may be distributed during a transaction authorization process. For example, in a payment transaction, a user 110 may provide payment credentials (e.g., via a digital wallet application on the mobile device 120) to the resource provider computer 130 (e.g., via the access device 125). The resource provider computer 130 may then generate and/or associate a transaction identifier with the transaction, and store a transaction record including the transaction identifier, the resource provider computer's resource provider identifier, a timestamp, and any other suitable information. The resource provider computer 130 may not store the payment credentials or other user information. Illustratively, payment credentials may include a PAN, an expiration date, a CVV, a name, an address, and any other suitable information.

The resource provider computer 130 may send an authorization request message to the transport computer 140. The authorization request message may include the payment credentials, the transaction identifier, the resource provider identifier, the timestamp, and any other suitable transaction information. The transport computer 140 may store a transaction record including the transaction identifier, the resource provider identifier, the timestamp, and any other suitable transaction information. However, in some embodiments, the transport computer 140 may not store the payment credentials.

The transport computer 140 may forward the authorization request message to the transaction processing computer 150. In some embodiments, the transport computer 140 may identify the transaction processing computer 150 based on one or more BIN digits. The transaction processing computer 150 may also store a transaction record including the received transaction identifier, the resource provider identifier, the timestamp, and any other suitable transaction information. The transaction processing computer 150 may further store an authorizing entity identifier as well as transport computer 140 identification information. For example, the authorizing entity identifier may be a BIN from the payment credentials. Thus, in some embodiments, the transaction processing computer 150 may be able to store a BIN instead of the payment credentials for identifying the authorization entity computer 160.

The transaction processing computer 150 may forward the authorization request message to the authorizing entity computer 160, which may also store a transaction record including the received transaction identifier, the resource provider identifier, the timestamp, and any other suitable transaction information. In some embodiments, the authorizing entity computer 160 may further store the payment credentials, as the authorizing entity computer 160 may manage the user's account.

Thus, the transaction information may be distributed via an authorization request message, and in some embodiments, several entities may store the transaction identifier, the resource provider identifier, the timestamp, and/or any other suitable transaction information instead of the payment credentials. Subsequent communications may use the transaction information instead of the payment credentials when referring to the transaction. For example, in some embodiments, the authorization response message may not include the payment credentials, and instead may include the transaction identifier, the resource provider identifier, the timestamp, and/or any other suitable transaction information. The method 600 below is another example of communications that may utilize the transaction information instead of the payment credentials. However, embodiments of the invention allow for any suitable type of communications and transaction-related operations to utilize the transaction information instead of the payment credentials for referring to a transaction.

Figure 6:
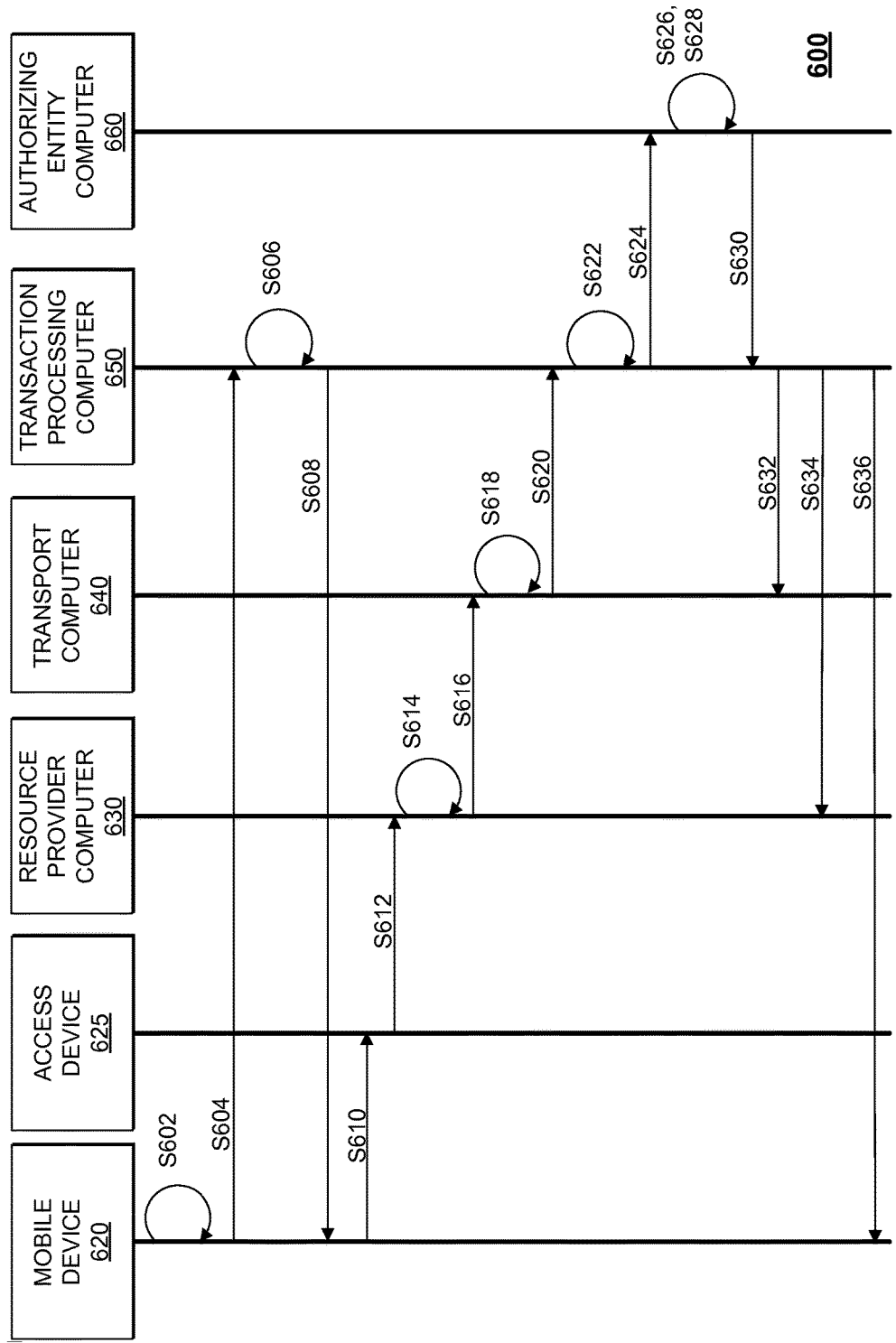
FIG. 6 shows a flow diagram illustrating a method processing a refund without utilizing payment credentials, according to embodiments of the invention.

A method 600 for processing a refund without utilizing payment credentials according to embodiments of the invention can be described with respect to FIG. 6. Some elements in other Figures are also referred to. The steps shown in the method 600 may be performed sequentially or in any suitable order in embodiments of the invention. In some embodiments, one or more of the steps may be optional.

Having previously performed a transaction as described above, the user may decide to return goods or services purchased during the transaction, or otherwise desire a refund. Accordingly, the user may request a refund from the resource provider computer 630. In some embodiments, the user may physically visit a resource provider location, access a resource provider website, or otherwise contact a resource provider.

At step S602, the user may activate a digital wallet application on the mobile device 620, and select a refund option for a previous transaction. For example, the digital wallet application may display a list of completed transactions associated with the user's digital wallet and/or payment account. The transactions may be classified by resource provider information (e.g., a name and/or address), a time, a date, an amount, purchased item information, and/or any other suitable transaction information. The user may select one of the transactions, and may request a refund for that transaction. The user may choose the original transaction that applies to the refund request by activating an input element on the mobile device 620. For example, there may be a software button or display activated by touch allowing the user to select and confirm a transaction. In some embodiments, the input elements may also be implemented by hardware buttons or activated by voice. Accordingly, the mobile device 620 may detect the selection by the user and determine the original transaction.

At step S604, the mobile device 620 may establish communication with the transaction processing computer 650 and request the transaction identifier, resource provider identifier, timestamp, and any other suitable transaction identifying information associated with the transaction. While, in some embodiments, the mobile device 620 may not yet have the transaction identifier and resource provider identifier, the mobile device 620 may be able to send other transaction details such as the resource provider information (e.g., a name and/or address), a time, an amount, purchased item information, a digital wallet application identifier, and/or any other suitable transaction information to the transaction processing computer 650 in order to identify the specific transaction for which additional transaction identifying information is being requested.

At step S606, the transaction processing computer 650 may identify, based on the transaction information received from the user and/or mobile device 720, a transaction record including a resource provider identifier, a transaction identifier, a timestamp, and/or any other suitable transaction identifying information associated with the transaction. The transaction may be uniquely identifiable based on the resource provider identifier, the transaction identifier, and/or the timestamp. In some embodiments, the transaction record may not include any sensitive account information (e.g., payment credentials) or sensitive user information (e.g., a name or address).

In some embodiments, the transaction processing computer 650 may be the digital wallet provider, and thus the transaction record may already be associated with the user's digital wallet. For example, the same digital wallet may have been used for the initial purchase.

At step S608, the transaction processing computer 650 may transmit the transaction identifying information from the identified transaction record to the mobile device 620. For example, the transaction processing computer 650 may send the resource provider identifier, the transaction identifier, a transaction timestamp, and any other suitable transaction information. In some embodiments, the transaction processing computer 650 may not send any sensitive account information or sensitive user information.

In some embodiments, the mobile device 620 may request the transaction identifying information from the authorizing entity computer 660 instead of the transaction processing computer 650. In other embodiments, the resource provider identifier, the transaction identifier, and/or the timestamp may already be stored at the mobile device 620, so the mobile device 620 may not need to request the transaction identifying information from an outside source at this point. For example, the resource provider identifier, transaction identifier, and/or the timestamp may have been provided to the mobile device 620 via an electronic receipt from the access device 625. Alternatively, the resource provider identifier, the transaction identifier, and/or the timestamp may have been transmitted to the mobile device 620 (e.g., to the digital wallet application) from the transaction processing computer 650 or authorizing entity computer 660 once the transaction was completed.

At step S610, the mobile device 620 may transmit the transaction identifier, the resource provider identifier, the timestamp, and/or any other suitable transaction information to the access device 625. For example, the user may be physically located at a resource provider location, and may present the mobile device 620 at the access device 625 for an NFC transmission or any other suitable type of transmission. Then, at step S612, the access device 625 may forward the transaction information to the resource provider computer 630. In some embodiments, the user may provide the transaction identifier, the resource provider identifier, the timestamp, and/or any other suitable transaction information to the resource provider computer 630 via another interface, such as via manual entry into a key pad, or online via a resource provider website.

At step S614, the resource provider computer 630 may optionally identify a stored transaction record based on the transaction identifier, the resource provider identifier, the timestamp, and/or any other suitable transaction information. The resource provider computer 630 may thereby validate that the transaction information is authentic, as well as determine an amount associated with the transaction. Thus, in some embodiments, the resource provider computer 630 may be able to identify a transaction without storing sensitive consumer or account information.

At step S616, the resource provider computer 630 may initiate the refund process by generating and sending a refund request message (which may also be referred to as a transaction reversal request message) to the transport computer 640. The refund request message may include the transaction identifier, the resource provider identifier, the timestamp, the transaction amount, and/or any other suitable transaction information. In some embodiments, the refund request message may not include sensitive consumer or account information. In some embodiments, the resource provider computer 630 may also include a digital certificate in the refund request message. In some cases, the digital certificate may include data signed by a key held by the resource provider computer 630.

In some embodiments, the resource provider computer 630 may instead transmit the refund request message directly to the transaction processing computer 650 which may then forward the refund request message to the transport computer 640.

At step S618, the transport computer 640 may optionally validate the transaction information in the refund request message. For example, the transport computer 640 may identify a stored transaction record with matching information. Thus, the transport computer 640 may confirm that the resource provider identifier, transaction identifier, and/or timestamp are authentic and associated with one another based on the stored transaction record. The transport computer 640 may also perform any other suitable validation, such as confirming that the refund request message is received from an authentic source. The transport computer 640 may also debit the transaction amount from a resource provider account for transfer to the user's account at the authorizing entity computer 660.

At step S620, the transport computer 640 may forward the refund request message to the transaction processing computer 650. In some embodiments, the funds may be transmitted via the refund request message. Alternatively, the refund request message can be an initial communication for confirming that the refund can take place, and the funds can be actually transferred from the transport computer 640 to the authorizing entity computer 660 at a later time.

At step S622, the transaction processing computer 650 may optionally validate that the transaction information is authentic. For example, the transaction processing computer 650 may confirm that there is a matching stored transaction record. The transaction processing computer 650 may also check the validity of a resource provider computer 630 digital certificate that may be included in the refund request message. The transaction processing computer 650 may also confirm that the refund request message was received from an authentic source (e.g., by verifying that the transport computer 640 has an active account).

The transaction processing computer 650 may also determine an authorizing entity identifier associated with the transaction information in a transaction record. For example, a BIN from the user's payment credentials may have been stored in the transaction record. By storing the authorizing entity identifier instead of the entire PAN or other payment credentials, the transaction processing computer 650 can identify the authorizing entity computer 660 associated with the transaction without having to store sensitive consumer or account information. For example, as mentioned above, the transaction processing computer 650 may operate suitable routing tables, and such routing tables may indicate which authorizing entities are associated with which authorizing entity identifiers.

In some embodiments, the authorizing entity identifier may already be present as a portion of the transaction identifier. In this case, the transaction processing computer 650 may locate the authorizing entity identifier from within the transaction identifier.

At step S624, the transaction processing computer 650 may forward the refund request message to the authorizing entity computer 660. The refund request message may include the transaction identifier, resource provider identifier, timestamp, transaction amount, and/or any other suitable information. In some embodiments, the refund request message may not include sensitive consumer or account information.

At step S626, the authorizing entity computer 660 may optionally validate the transaction information, and then may identify the user's associated payment account. For example, the authorizing entity computer 660 may identify a transaction record based on the transaction identifier, resource provider identifier, timestamp, transaction amount, and/or any other suitable information, and the record may include a set of payment credentials. In some embodiments, the authorizing entity computer 660 may use a private key to validate a digital certificate included in the refund request message, or verify that one or more of the requesting entities are trusted entities.

At step S628, the authorizing entity computer 660 may apply the refund by crediting the transaction amount to the identified payment account, crediting the current balance of the account. In some embodiments, the amount refunded may vary depending on return policies set by the resource provider computer 630. In some embodiments, the authorizing entity computer 660 may instead authorize the refund and return a response to the transport computer 640, and the funds may instead be transferred at a later time.

At step S630, the authorizing entity computer 660 may send a refund response message to the transaction processing computer 650 indicating that the refund was successfully authorized and/or processed. The transaction processing computer 650 may then send notifications indicating the completion of the refund. The notifications may comprise a message indicating the successful completion of the refund, as well as any other suitable information surrounding the returns process. For example, the transaction processing computer 650 may send a notification to the transport computer 640 at step S632, the transaction processing computer 650 may send a notification to the resource provider computer 630 at step S634, and the transaction processing computer 650 may send a notification to the mobile device 620 at step S636. In some embodiments, each notification may include the transaction identifier, the resource provider identifier and/or any other suitable information, but not any sensitive information (e.g., payment credentials). The transaction processing computer 650 may also initiate and coordinate a clearing and settlement process to finalize the refund. In some embodiments, the resource provider computer 630 may provide a refund receipt (e.g., an electronic receipt) to the mobile device 620 via the access device 625.

Accordingly, in some embodiments, refund communications between multiple entities can be conducted without storing, sending, or otherwise exposing sensitive information (e.g., payment credentials, user information, etc.). Instead, a transaction can be identified and a refund processed based on transaction information such as a transaction identifier, a resource provider identifier, and/or a timestamp.

Figure 7:
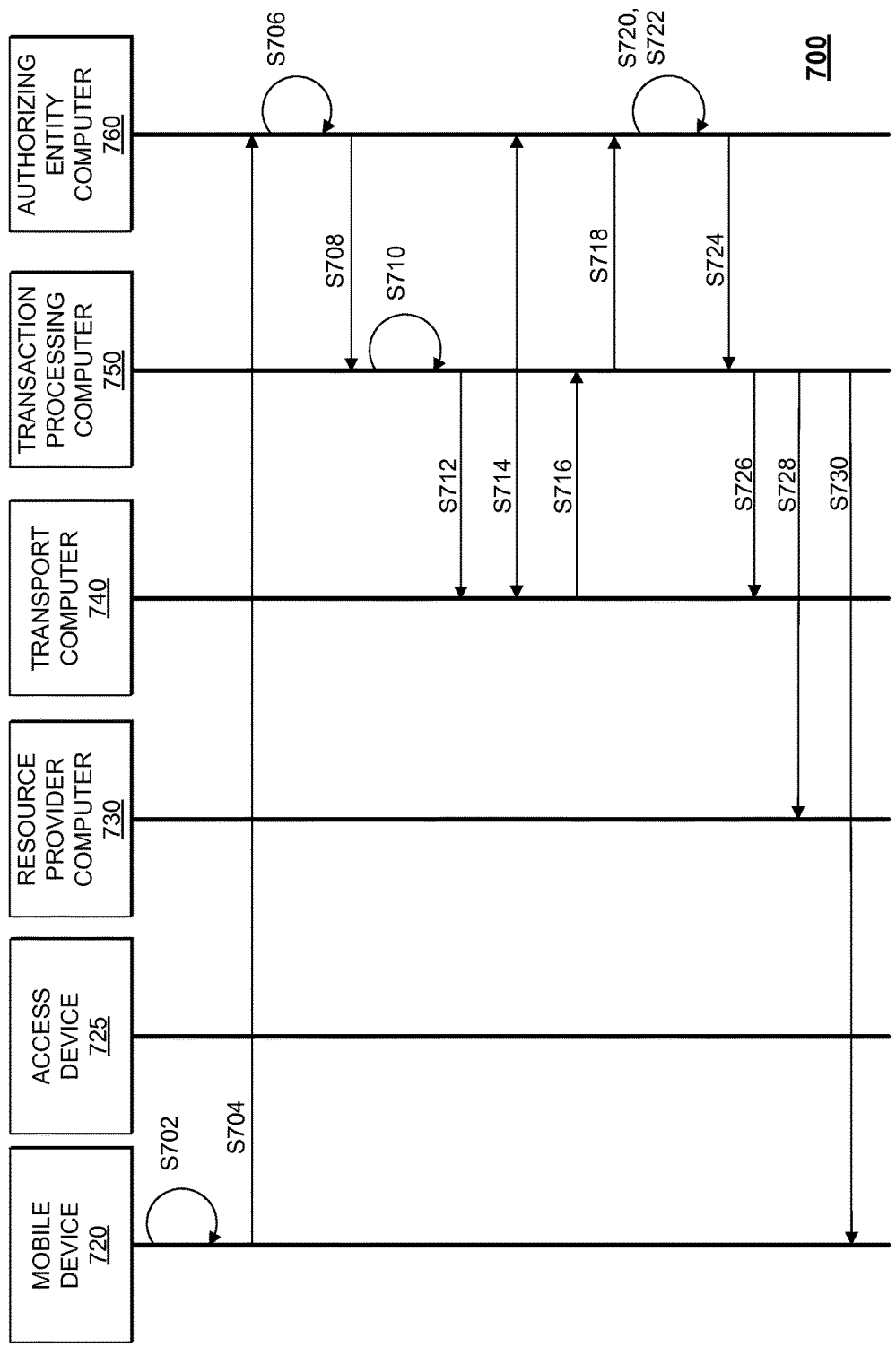
FIG. 7 shows a flow diagram illustrating a method processing a chargeback without utilizing payment credentials, according to embodiments of the invention.

A method 700 for processing a chargeback without utilizing payment credentials according to embodiments of the invention can be described with respect to FIG. 7. Some elements in other Figures are also referred to. The steps shown in the method 700 may be performed sequentially or in any suitable order in embodiments of the invention. In some embodiments, one or more of the steps may be optional.

A user may determine that a fraudulent transaction was made with the user's account, that the goods or services were never provided after payment, or that a chargeback is otherwise desired. Accordingly, the user may contact the authorizing entity computer 760 to request a chargeback.

At step S702, the user may activate a digital wallet application on the mobile device 720, and select a chargeback option for a previous transaction. For example, the digital wallet application may display a list of completed transactions associated with the user's digital wallet and/or payment account. The transactions may be classified by resource provider information (e.g., a name and/or address), a time, a date, an amount, purchased item information, and/or any other suitable information. The user may select one of the transactions, and may request a chargeback for that transaction. The user may choose the original transaction that applies to the chargeback request by activating an input element on the mobile device 720. For example, there may be a software button or display activated by touch allowing the user to select and confirm a transaction. In some embodiments, the input elements may also be implemented by hardware buttons or activated by voice. Accordingly, the mobile device 720 may detect the selection by the user and determine the original transaction for the chargeback.

At step S704, the mobile device 720 may establish communication with the authorizing entity computer 760 and request a chargeback for the transaction. For example, the mobile device 720 may send the resource provider information (e.g., a name and/or address), a time, an amount, purchased item information, a digital wallet application identifier, and/or any other suitable information for identifying the transaction to the authorizing entity computer 760.

In some embodiments, the user may contact the authorizing entity via another channel to request a chargeback or otherwise dispute a transaction. For example, the user may call the authorizing entity via telephone, or contact the authorizing entity though an online banking website.

At step S706, the authorizing entity computer 760 may identify, based on the information received from the user and/or mobile device 720, a transaction record associated with the transaction. The transaction record may include additional transaction information such as a resource provider identifier, a transaction identifier, a timestamp, and/or and any other suitable transaction identifying information. The transaction may be uniquely identifiable based on the resource provider identifier, the transaction identifier, and/or the timestamp. The transaction record at the authorizing entity computer 760 may also contain information about the user and user account, such as payment credentials associated with the user account. However, in some embodiments, the authorizing entity computer 760 may not disclose such sensitive information, and may only use non-sensitive transaction information such as the resource provider identifier, the transaction identifier, and/or the timestamp to identify the transaction when communicating with other entities, such as the transaction processing computer 750, the mobile device 720, and the transport computer 740.

In some embodiments, the resource provider identifier, the transaction identifier, and/or the timestamp may be stored at the mobile device 720, and the mobile device 720 may provide this information to the authorizing entity computer 760 along with the chargeback request. In some embodiments, the authorizing entity computer 760 may be the digital wallet provider, and thus the transaction record may already be associated with the user's digital wallet. For example, the same digital wallet may have been used for the initial purchase.

At step S708, the authorizing entity computer 760 may initiate the chargeback process by generating and sending a chargeback request message (which may also be referred to as a transaction reversal request message) to the transaction processing computer 750. The chargeback request message may include the resource provider identifier, the transaction identifier, the timestamp, a transaction amount, and any other suitable transaction information. In some embodiments, the chargeback request message may not include sensitive consumer or account information (e.g., payment credentials).

At step S710, the transaction processing computer 750 may optionally validate the transaction information in the chargeback request message. For example, the transaction processing computer 750 may identify a stored transaction record with matching information. Thus, the transaction processing computer 750 may confirm that the resource provider identifier, transaction identifier, and/or timestamp are authentic and associated with one another based on the stored transaction record. In some embodiments, the transaction processing computer 750 may not store any sensitive user or account information, and the transaction processing computer 750 may use the transaction information to identify the transaction instead of payment credentials.

The transaction processing computer 750 may also determine a transport computer 740 associated with the transaction. For example, the transaction record may indicate an associated transport computer 740 and/or resource provider computer 730 (e.g., identified by the resource provider identifier or other information).

At step S712, the transaction processing computer 750 may forward the chargeback request message to the transport computer 740. The transport computer 740 may identify a stored transaction record based on the transaction identifier, the resource provider identifier, the timestamp, and/or other suitable transaction information, and otherwise validate that the chargeback request is authentic. In some embodiments, the transport computer 740 may be able to authorize the chargeback. In other embodiments, the transport computer 740 may consult the resource provider computer 730 about whether to or not to allow the chargeback. In other embodiments, a dispute process may take place to determine whether or not the chargeback will take place.

At step S714, the transaction processing computer 750 may establish a communication channel for disputing the transaction. The communication channel may allow for communication between the authorizing entity computer 760, the transport computer 740, the transaction processing computer 750, the resource provider computer 730, the mobile device 720, and/or any other suitable entity. One or more of these entities may be able to interact to determine which parties are liable for the transaction. For example, a determination may be made as to the likelihood that the transaction was fraudulently conducted. If the chargeback is successfully disputed such that the chargeback is approved, the method may proceed to step S716.

At step S716, the transport computer 740 may send a chargeback response message to the transaction processing computer 750 indicating that the chargeback is authorized. The chargeback response message may include the transaction identifier, the resource provider identifier, the timestamp, an indication of the transaction amount, and/or any other suitable information. In some embodiments, the chargeback response message may not include sensitive consumer or account information (e.g., payment credentials).

In some embodiments, the transport computer 740 may debit the transaction amount from the resource provider's account and transfer the funds to the authorizing entity computer 760 via the chargeback response message. In other embodiments, the funds may be transferred at a later time.

At step S718, the transport the transaction processing computer 750 may forward the chargeback response message to the authorizing entity computer 760. In some embodiments, the transaction processing computer 750 may optionally first validate the transaction information in the chargeback response message (e.g., by checking whether there is a stored transaction record with matching transaction information). The transaction processing computer 750 may also identify a transaction record based on the chargeback response message, and determine an authorizing entity identifier (e.g. a BIN) indicated in the transaction record. This may be done to verify that the chargeback is being transferred to the appropriate authorizing entity computer 760. In some embodiments, by only storing the authorizing entity identifier, the transaction processing computer 750 can avoid saving the payment credentials or any other sensitive user data.

At step S720, the authorizing entity computer 760 may optionally validate the transaction information in the chargeback response message, and then may identify the user's associated payment account. For example, the authorizing entity computer 760 may identify a transaction record with a stored transaction record with a matching transaction identifier, resource provider identifier, and/or timestamp. The transaction record may further include a set of payment credentials associated with the user's payment account.

At step S722, the authorizing entity computer 760 may apply the chargeback by crediting the transaction amount to the identified user payment account, crediting the current balance of the account. In some embodiments, the amount refunded may vary depending on return policies set by the resource provider computer 730. In some embodiments, the authorizing entity computer 760 may confirm the authorized chargeback and return a response to the transport computer 740, and the funds may instead be transferred at a later time.

At step S724, the authorizing entity computer 760 may send a chargeback success message to the transaction processing computer 750 indicating that the chargeback was successfully processed. In some embodiments, the authorizing entity computer 760 may transmit a notification to the mobile device 720, or the authorizing entity may communicate by phone call to the user that the chargeback was completed successfully.

The transaction processing computer 750 may then send notifications indicating the completion of the chargeback. For example, the transaction processing computer 750 may send a notification to the transport computer 740 at step S726, the transaction processing computer 750 may send a notification to the resource provider computer 730 at step S728, and the transaction processing computer 650 may send a notification to the mobile device 620 at step S730. The notifications may comprise a message indicating the successful completion of the chargeback, as well as any other suitable information surrounding the returns process. In some embodiments, each notification may include the transaction identifier, resource provider identifier, timestamp, and/or any other suitable transaction information, but not sensitive information (e.g., payment credentials). The transaction processing computer 650 may also initiate a clearing and settlement process to finalize the chargeback. In some embodiments, the resource provider computer 730 may transmit a chargeback receipt (e.g., an electronic receipt) to the mobile device 720.

Accordingly, in some embodiments, chargeback communications between multiple entities can be conducted without storing, sending, or otherwise exposing sensitive information (e.g., payment credentials, user information, etc.). Instead, a transaction can be identified and a refund processed based on transaction information such as a transaction identifier, a resource provider identifier, and/or a timestamp.

Embodiments of the invention have a number of advantages. For example, in embodiments of the invention, sensitive information is made more secure. Transactions can be identified by non-sensitive transaction information, such a resource provider identifier and transaction identifier, instead of using sensitive payment credentials for identifying a transaction. For example, during transaction reversal communications, authorization response messages, or any other transaction-related communications, the specific transaction can be identified by non-sensitive information. This means that, in some embodiments, cardholder data does not need to be sent to various entities in order to facilitate a returns or chargeback process. Thus, instead of exposing payment credentials and other user information by widespread storage in various entities' databases and inclusion in regular communications, the sensitive information is kept secure, and there is less chance of compromise.

Additionally, embodiments of the invention advantageously allow resource providers to generate transaction identifiers and timestamps. This gives the resource provider control over whether a transaction can be uniquely identified. In other words, as long as the resource provider allocates unique transaction identifiers for each transaction, there is a low risk of misidentifying a transaction or an associated user account. Using a resource provider identifier in conjunction with the locally-generated transaction identifier allows the transaction to be globally uniquely identified. Further, this creates a simple, elegant system for transaction identification. Instead of retrieving transaction identifiers from a central source (such as a transaction processing computer) for each transaction, transaction identifiers can be generated locally, decreasing back-and-forth communication and improving efficiency.

Additionally, embodiments of the invention can apply to other areas beyond financial systems and transaction-related processing. For example, embodiments can apply to data access. It may be desirable to protect a user password or other access credentials used to access secure data on a server computer (e.g., an email account, an online newspaper subscription, sensitive medical information, or other confidential data, webpages, or networks). Embodiments allow a transaction identifier, such as a session ID, and a resource provider identifier, such as an IP address or other unique device identifier, to be used in access-related communications instead of the user's access credentials.

FIG. 8 is a high-level block diagram 12 of a computer system that may be used to implement any of the entities or components described above. The subsystems shown in FIG. 8 are interconnected via a system bus 75. Additional subsystems include a printer 74, keyboard 78, storage device 79, and monitor 76, which is coupled to display adapter 82. Peripherals and input/output (I/O) devices, which couple to I/O controller 71, can be connected to the computer system by any number of means known in the art, such as a serial port. For example, I/O port 77 or external interface 81 can be used to connect the computer apparatus to a wide area network such as the Internet, a mouse input device, or a scanner. The interconnection via system bus 75 allows the central processor 73 to communicate with each subsystem and to control the execution of instructions from system memory 72 or the storage device 79, as well as the exchange of information between subsystems. The system memory 72 and/or the storage device may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
receiving, by a transaction processing computer, from a resource provider computer associated with a resource provider, an authorization request message for a transaction between a user and the resource provider, the authorization request message including, a transaction identifier that was generated by the resource provider computer, a resource provider identifier that was generated by the transaction processing computer, a primary account number associated with an account of the user, and at least one of a timestamp, a transaction amount, information about purchased items, geo-location information associated with the transaction, or a digital certificate associated with the resource provider;
determining, by the transaction processing computer, an authorizing entity identifier associated with an authorizing entity based on the authorization request message;
storing, by the transaction processing computer, a transaction record including the resource provider identifier, the transaction identifier, the authorizing entity identifier, and at least one of the timestamp, the transaction amount, the information about purchased items, the geo-location information associated with the transaction, or the digital certificate associated with the resource provider, wherein the primary account number is not stored;
transmitting, by the transaction processing computer, the authorization request message to an authorizing entity computer associated with the authorizing entity identifier, wherein the authorizing entity computer authorizes the transaction based on the primary account number;
receiving, by the transaction processing computer, an authorization response message including the resource provider identifier and the transaction identifier, and not including the primary account number;
transmitting, by the transaction processing computer, the authorization response message to the resource provider computer;
receiving, by the transaction processing computer, from the resource provider computer, a request for reversing the transaction, the request including the resource provider identifier, the transaction identifier, and at least one of the timestamp, the transaction amount, the information about purchased items, the geo-location information associated with the transaction, or the digital certificate associated with the resource provider, the request not including the primary account number, wherein the transaction is uniquely identified by a combination of the resource provider identifier and the transaction identifier;
identifying, by the transaction processing computer, the transaction record based on the resource provider identifier and the transaction identifier;
obtaining, by the transaction processing computer, the authorizing entity identifier from the transaction record; and
forwarding, by the transaction processing computer, the request to the authorizing entity computer associated with the authorizing entity identifier, wherein the authorizing entity computer determines the primary account number based on the resource provider identifier and the transaction identifier, and wherein the authorizing entity computer approves of the transaction reversal.

2. The method of claim 1, wherein the resource provider computer sent the transaction reversal request in response to receiving the transaction identifier and the resource provider identifier from a user device.

3. The method of claim 1, further comprising:
receiving, by the transaction processing computer, from a user device, a request for transaction data, the request including a time, user information, and resource provider information;
identifying, by the transaction processing computer, based on the request, the transaction identifier and the resource provider identifier; and
providing, by the transaction processing computer, the transaction identifier and the resource provider identifier to the user device.

4. The method of claim 1, wherein the request for reversing the transaction between the user and the resource provider also does not include a user name, an expiration date, a payment token, or a card verification value.

5. The method of claim 1, further comprising:
generating, by the transaction processing computer, the resource provider identifier for the resource provider; and
transmitting, by the transaction processing computer, the resource provider identifier to the resource provider computer.

6. The method of claim 1, wherein the authorizing entity identifier is an issuer bank identification number.

7. The method of claim 1, wherein the transaction processing computer is associated with a transaction processing network, wherein the resource provider is a merchant, and wherein the authorizing entity is an issuer.

8. A transaction processing computer comprising:
a processor; and
a computer readable medium, the computer readable medium comprising code, executable by the processor, for implementing a method comprising:

receiving, from a resource provider computer associated with a resource provider, an authorization request message for a transaction between a user and the resource provider, the authorization request message including a transaction identifier that was generated by the resource provider computer, a resource provider identifier that was generated by the transaction processing computer, a primary account number associated with an account of the user, and at least one of a timestamp, a transaction amount, information about purchased items, geo-location information associated with the transaction, or a digital certificate associated with the resource provider;

determining an authorizing entity identifier associated with an authorizing entity based on the authorization request message;

storing a transaction record including the resource provider identifier, the transaction identifier, the authorizing entity identifier, and at least one of the timestamp, the transaction amount, the information about purchased items, the geo-location information associated with the transaction, or the digital certificate associated with the resource provider, wherein the primary account number is not stored;

transmitting the authorization request message to an authorizing entity computer associated with the authorizing entity identifier, wherein the authorizing entity computer authorizes the transaction based on the primary account number;

receiving an authorization response message including the resource provider identifier and the transaction identifier, and not including the primary account number;

transmitting the authorization response message to the resource provider computer;

receiving, from the resource provider computer, a request for reversing the transaction, the request including the resource provider identifier, the transaction identifier, and at least one of the timestamp, the transaction amount, the information about purchased items, the geo-location information associated with the transaction, or the digital certificate associated with the resource provider, the request not including the primary account number, wherein the transaction is uniquely identified by a combination of the resource provider identifier and the transaction identifier;

identifying the transaction record based on the resource provider identifier and the transaction identifier;

obtaining the authorizing entity identifier from the transaction record; and forwarding the request to the authorizing entity computer associated with the authorizing entity identifier, wherein the authorizing entity computer determines the primary account number based on the resource provider identifier and the transaction identifier, and wherein the authorizing entity computer approves of the transaction reversal.

9. The transaction processing computer of claim 8, wherein the resource provider computer sent the transaction reversal request in response to receiving the transaction identifier and the resource provider identifier from a user device.

10. The transaction processing computer of claim 8, wherein the authorizing entity identifier is a portion of the primary account number.

11. The transaction processing computer of claim 8, wherein the request for reversing the transaction between the user and the resource provider also does not include a user name, an expiration date, a payment token, or a card verification value.

12. The transaction processing computer of claim 8, the method further comprising:
generating the resource provider identifier; and
transmitting the resource provider identifier to the resource provider computer.

13. The transaction processing computer of claim 8, wherein the authorizing entity identifier is an issuer bank identification number.

14. The transaction processing computer of claim 8, wherein the transaction processing computer is associated with a transaction processing network, wherein the resource provider is a merchant, and wherein the authorizing entity is an issuer.

* * * * *